United States Patent
Yamamoto et al.

(10) Patent No.: US 6,906,461 B2
(45) Date of Patent: Jun. 14, 2005

(54) LIGHT SOURCE DEVICE WITH INNER AND OUTER ELECTRODES AND LIQUID CRYSTAL DISPLAY DEVICE

(75) Inventors: Norikazu Yamamoto, Yawata (JP); Nobuhiro Shimizu, Nara (JP); Teruaki Shigeta, Neyagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 206 days.

(21) Appl. No.: 10/322,174

(22) Filed: Dec. 17, 2002

(65) Prior Publication Data

US 2003/0122488 A1 Jul. 3, 2003

(30) Foreign Application Priority Data

Dec. 28, 2001 (JP) .......................................... 2001-399925

(51) Int. Cl.[7] .............................. H01J 17/44; H01J 61/54
(52) U.S. Cl. ........................ 313/594; 313/491; 313/607; 313/620; 313/631; 362/260; 362/29
(58) Field of Search ................................ 313/594, 491, 313/493, 607, 620, 631, 635, 643; 362/260, 217, 29, 84

(56) References Cited

U.S. PATENT DOCUMENTS

| | | | |
|---|---|---|---|
| 3,927,342 A | 12/1975 | Bode et al. ................. 313/586 |
| 4,013,912 A | 3/1977 | Hinson ....................... 313/642 |
| 4,038,577 A | 7/1977 | Bode et al. ................. 313/586 |
| 4,387,322 A | 6/1983 | Nixon ........................ 313/497 |
| 4,645,979 A | 2/1987 | Chow ....................... 315/169.1 |
| 4,899,090 A | * | 2/1990 | Yoshiike et al. ............ 315/335 |
| 5,013,959 A | * | 5/1991 | Kogelschatz ................. 313/36 |
| 5,117,160 A | * | 5/1992 | Konda et al. ............... 315/326 |
| 5,343,114 A | 8/1994 | Beneking et al. ............ 313/485 |
| 5,514,934 A | 5/1996 | Matsumoto et al. ......... 313/607 |
| 5,604,410 A | 2/1997 | Vollkommer et al. ....... 315/246 |
| 5,828,180 A | 10/1998 | Shinada et al. ............. 315/160 |
| 6,034,476 A | * | 3/2000 | Tamura ....................... 313/607 |
| 6,255,782 B1 | 7/2001 | Kuroda et al. ............ 315/169.1 |
| 6,331,064 B1 | * | 12/2001 | Nishiyama et al. ......... 362/260 |
| 6,590,319 B2 | 7/2003 | Moom ........................ 313/292 |

FOREIGN PATENT DOCUMENTS

| | | |
|---|---|---|
| EP | 1 146 544 | 10/2001 |
| EP | 1 152 454 | 11/2001 |
| JP | 1-143135 | 6/1989 |
| JP | 4-280059 | 10/1992 |
| JP | 5-29085 | 2/1993 |

(Continued)

*Primary Examiner*—Joseph Williams
*Assistant Examiner*—Kevin Quarterman
(74) *Attorney, Agent, or Firm*—Merchant & Gould P.C.

(57) ABSTRACT

A light source device includes a discharge tube, a discharge medium sealed inside the discharge tube, and inner and outer electrodes for exciting the discharge medium. The inner electrode is arranged inside the discharge tube. The outer electrode includes a first outer electrode and a second outer electrode that are connected electrically with each other. The first outer electrode is in contact with an outer surface of the discharge tube at a plurality of first contact portions that are located at different distances from the inner electrode and are provided discontinuously. The second outer electrode is in contact with the outer surface of the discharge tube at second contact portions. The second contact portions are arranged closer to the inner electrode than the first contact portions at a surface density greater than that of the first contact portions. Thus, it is possible to provide a light source device with decreased fluctuations in the brightness distribution and with higher brightness, and a liquid crystal display device in which the light source device is employed.

10 Claims, 16 Drawing Sheets

FOREIGN PATENT DOCUMENTS

| | | |
|---|---|---|
| JP | 6-181050 | 6/1994 |
| JP | 9-161726 | 6/1997 |
| JP | 10-112290 | 4/1998 |
| JP | 10-284008 | 10/1998 |
| JP | 11-86797 | 3/1999 |
| JP | 2000-259088 | 9/2000 |
| JP | 2000-353494 | 12/2000 |
| JP | 2001-143662 | 5/2001 |
| JP | 2001-237586 | 8/2001 |
| JP | 2001-243921 | 9/2001 |
| JP | 2001-243922 | 9/2001 |
| JP | 2001-325919 | 11/2001 |
| JP | 2002-42737 | 2/2002 |

* cited by examiner

LIGHT SOURCE DEVICE WITH INNER AND OUTER ELECTRODES AND LIQUID CRYSTAL DISPLAY DEVICE

BACKGROUND OF THE INVENTION

1. Field of the Invention

The present invention relates to a light source device that includes a discharge tube with a discharge medium sealed therein and electrodes for exciting the discharge medium, and relates to a liquid crystal display device employing the light source device.

2. Related Background Art

Recently, with respect to backlights (light source devices) for use in liquid crystal display devices, etc., studies have been directed to backlights in which mercury is not used (a backlight of this type hereinafter sometimes is referred to as mercuryless backlight), in addition to the studies on backlights in which mercury is used. The mercuryless backlight, which does not employ mercury, does not suffer from a decrease in a light emission efficiency caused by a rise of mercury temperature, thereby having an advantage of quicker start of the emission of luminous fluxes. Further, the mercuryless backlight is environmentally preferable.

As a light source device in which mercury is not used, a discharge lamp device is disclosed that includes a bulb in which a rare gas is sealed, an inner electrode provided inside the bulb, and an outer electrode provided outside the bulb (JP 5(1993)-29085 A). The outer electrode is a linear electrode, and is formed on an outer surface of the bulb so as to be parallel with a central axis of the bulb. By applying a voltage across the inner and outer electrodes, this rare gas discharge lamp device emits light.

Further, a rare gas discharge lamp is disclosed that includes a discharge tube in which a rare gas is sealed, an inner electrode formed inside the discharge tube, and an outer electrode formed spirally on an outer surface of the discharge tube (JP 10(1998)-112290 A).

Furthermore, as a discharge lamp with a rare gas as a principal discharge medium, a discharge lamp is disclosed that includes an air-tight vessel, an inner electrode provided inside the air-tight vessel, and an outer electrode in such a form as a coil form, a mesh form, etc. (JP 2001-325919 A). This publication discloses a method of fixing the outer electrode using a shrinkable tube.

Furthermore, a discharge lamp disclosed in U.S. Pat. No. 5,604,410 includes a discharge tube in which a rare gas is sealed, an inner electrode, and an outer electrode. The inner electrode is formed along a central axis of the discharge tube throughout a substantial entirety of the discharge tube. The outer electrode is a linear electrode, and is formed on an outer surface of the discharge tube so as to be parallel with a central axis of the discharge tube.

However, in the case where a linear outer electrode is formed throughout a substantial entirety of the discharge tube, the discharge is constricted in the vicinity of the outer electrode sometimes, thereby making it impossible to excite the discharge medium efficiently, sometimes resulting in a decrease in the light emission efficiency. In the case where an outer electrode in a spiral form is provided on an outer surface of a discharge tube, the discharge also tends to be constricted, since the outer electrode is brought into contact linearly throughout the entirety of the discharge tube.

SUMMARY OF THE INVENTION

Therefore, with the foregoing in mind, it is an object of the present invention to provide a novel light source device, and a liquid crystal display device employing the same.

To achieve the foregoing object, a light source device of the present invention includes at least one discharge tube, a discharge medium sealed inside the discharge tube, and inner and outer electrodes for exciting the discharge medium. The inner electrode is arranged inside the discharge tube, and the outer electrode includes a first outer electrode and a second outer electrode, the second electrode being connected electrically with the first outer electrode. The first outer electrode is in contact with an outer surface of the discharge tube at a plurality of first contact portions that are located at different distances from the inner electrode and are provided discontinuously. The second outer electrode is in contact with the outer surface of the discharge tube at second contact portions. The second contact portions are arranged closer to the inner electrode than the first contact portions at a surface density greater than that of the first contact portions. It should be noted that cases meant by the "contact of an electrode with an outer surface of the discharge tube" include a case where the electrode and the discharge tube are in contact with each other via a dielectric or the like in the present specification. The "contact" herein means that no air space is present between two members.

In the foregoing light source device, the plurality of the first contact portions may be arranged in a tube axial direction of the discharge tube.

In the foregoing light source device, the discharge tube may include a glass tube, and a dielectric layer formed on an outer surface of the glass tube.

In the foregoing light source device, the first and second outer electrodes may be in contact with the discharge tube via a dielectric.

In the foregoing light source device, the discharge medium may contain at least one selected from xenon gas, krypton gas, argon gas, neon gas, and helium gas.

In the foregoing light source device, the discharge medium does not have to contain mercury.

The foregoing light source device further may include a supporting plate, and may be configured so that a plurality of the discharge tubes are held on the supporting plate, the first outer electrode includes a plurality of first linear electrodes arranged in parallel, and the discharge tubes are arranged so as to be perpendicular to the linear electrodes.

In the foregoing light source device, the second outer electrode may include a plurality of second linear electrodes arranged substantially in parallel with the first linear electrodes, the intervals at which the first linear electrodes are arranged may be not less than 1.0 mm and not more than 50 mm, and the intervals at which the second linear electrodes are arranged may be not less than 0.1 mm and less than 1.0 mm.

Furthermore, a liquid crystal display device of the present invention includes a light source device, and a liquid crystal panel that transmits light emitted from the light source device. The light source device includes at least one discharge tube, a discharge medium sealed inside the discharge tube, and inner and outer electrodes for exciting the discharge medium. The inner electrode is arranged inside the discharge tube. The outer electrode includes a first outer electrode and a second outer electrode that are connected electrically with each other. The first outer electrode is in contact with an outer surface of the discharge tube at a plurality of first contact portions that are located at different distances from the inner electrode and are provided discontinuously. The second outer electrode is in contact with the outer surface of the discharge tube at second contact portions. The second contact portions are arranged closer to the inner electrode than the first contact portions at a surface density greater than that of the first contact portions.

In the foregoing liquid crystal display device, the light source device further may include a light-guiding plate that receives light emitted from the discharge tube and allows the light to leave a principal surface thereof, and the liquid crystal panel may be arranged so as to face the light-guiding plate.

In the foregoing liquid crystal display device, the light source device further may include a supporting plate, and may be configured so that plurality of the discharge tubes are held on the supporting plate, the second outer electrode includes a plurality of linear electrodes arranged in parallel, and the discharge tubes are arranged so as to be perpendicular to the linear electrodes.

DETAILED DESCRIPTION OF THE INVENTION

Figure 1:
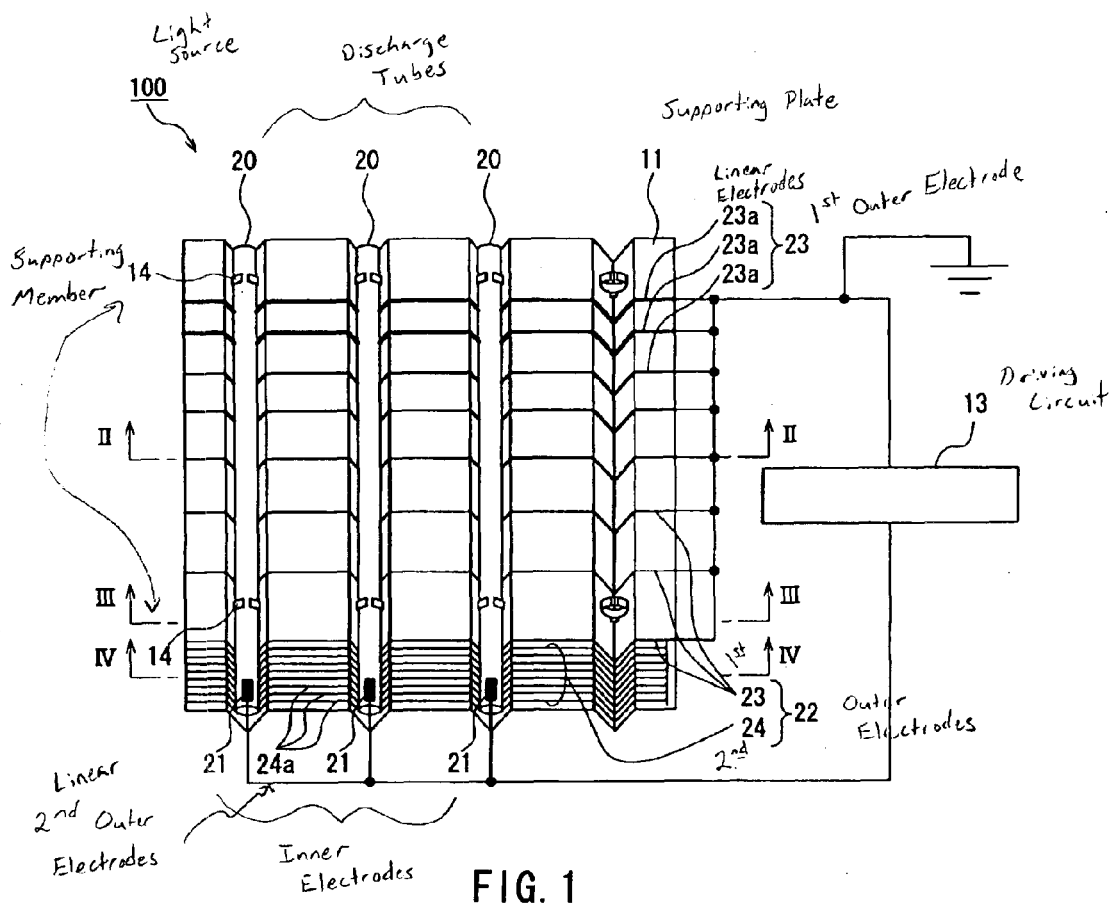
FIG. 1 is a perspective view schematically illustrating an example of a light source device of the present invention.

The following will describe embodiments of the present invention while referring to the drawings. It should be noted that in the following description, the same members are designated by the same reference numerals and duplicate descriptions of the same are omitted in some cases.

Embodiment 1

Figure 2:
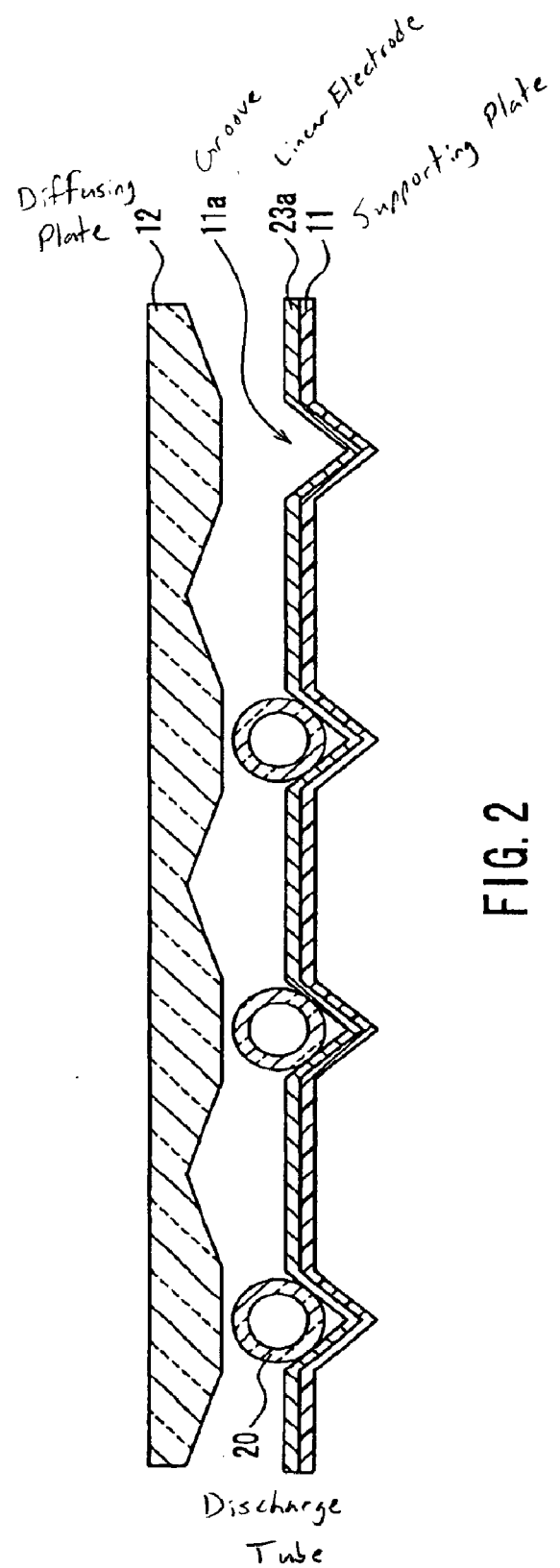
FIG. 2 is a cross-sectional view of the light source device shown in FIG. 1.
Figure 3:
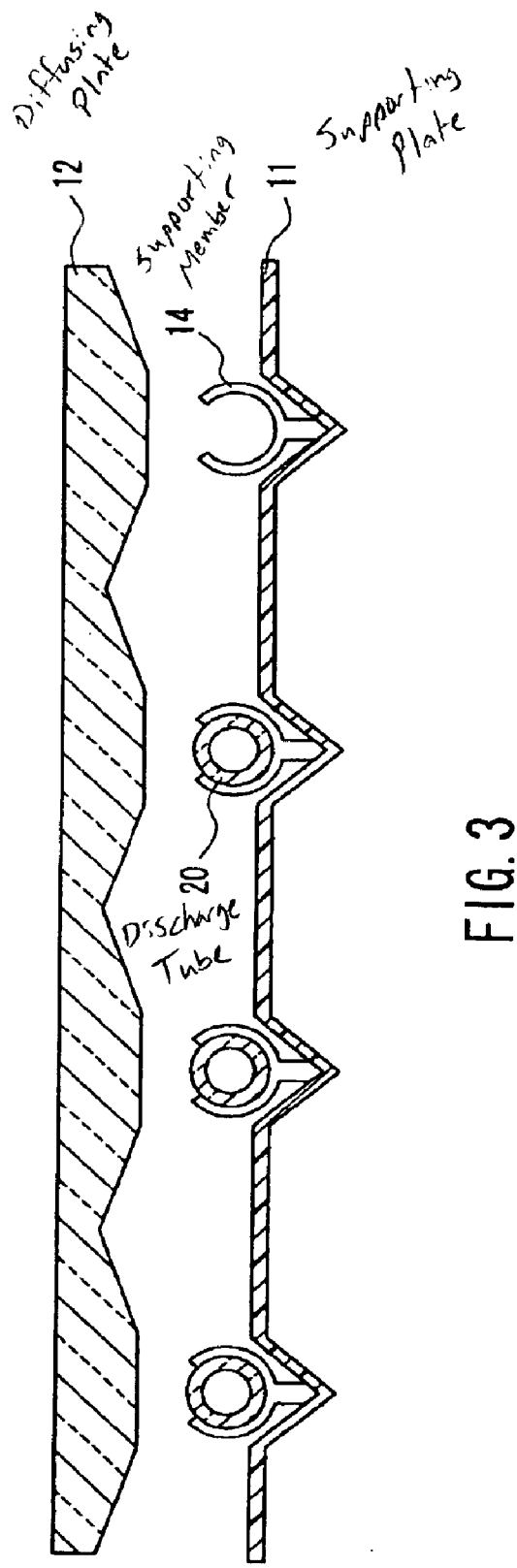
FIG. 3 is another cross-sectional view of the light source device shown in FIG. 1.
Figure 4:
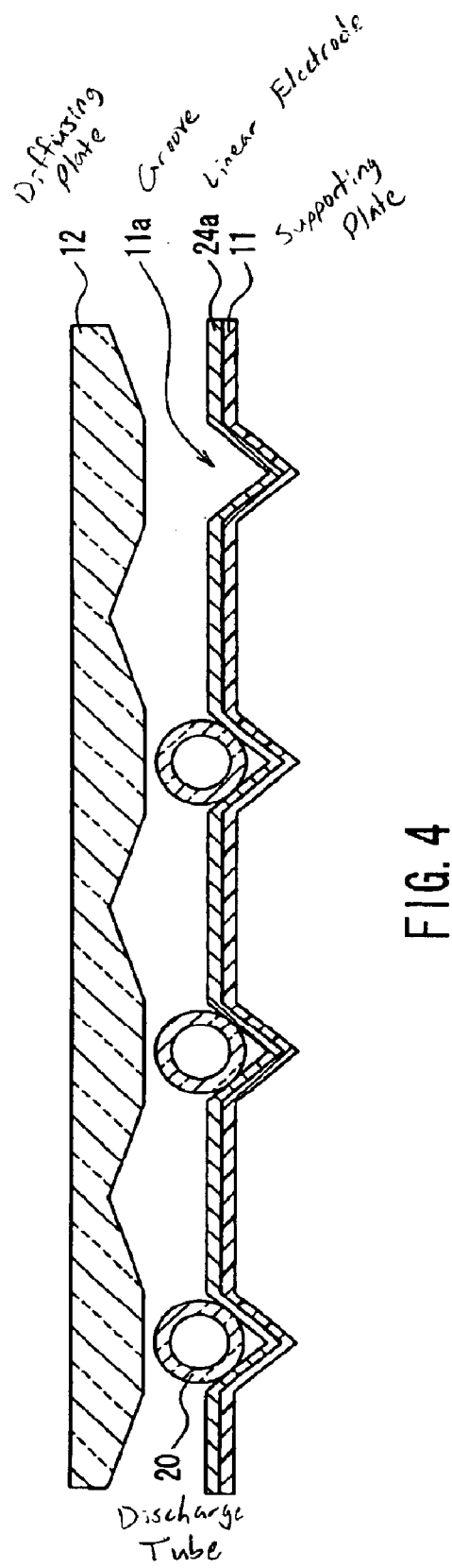
FIG. 4 is still another cross-sectional view of the light source device shown in FIG. 1.

In Embodiment 1, a discharge lamp as an example of a light source device of the present invention is described. FIG. 1 schematically illustrates a configuration of a light source device 100 of Embodiment 1. FIG. 2 is a cross-sectional view of the light source device 100 taken along a line II—II in FIG. 1. FIG. 3 is a cross-sectional view of the same taken along a line III—III in FIG. 1. FIG. 4 is a cross-sectional view of the same taken along a line IV—IV in FIG. 1. It should be noted that the illustration of a diffusing plate is omitted in FIG. 1. In FIGS. 2 and 4, the illustration of a phosphor layer is omitted. Further, in FIGS. 1 to 4, the illustration of a rightmost discharge tube is omitted.

The light source device 100 includes a supporting plate 11, a diffusing plate 12, discharge tubes 20, inner electrodes 21, and an outer electrode 22. The outer electrode 22 includes a first outer electrode 23 and a second outer electrode 24 that are connected electrically with each other via electric lines. The outer electrode 22 is connected with a ground potential (grounded). A voltage is applied across each inner electrode 21 and the outer electrode 22 by a driving circuit 13. As the driving circuit 13, any one of generally used circuits including an inverter circuit can be used. A voltage applied across the inner electrode 21 and the outer electrode 22 is, for instance, a rectangular waveform, and optionally may have a polarity inversion. Though varying with the shape of the discharge tube and the gas pressure inside the discharge tube, the electric power supplied across the inner electrodes 21 and the outer electrode 22 is, for instance, at a level of 0.01 W to 0.04 W per 1 mm of the discharge tube (preferably, 0.015 W to 0.025 W).

Grooves 11a having a V-shaped cross section each are formed in the supporting plate 11 so that the discharge tubes 20 are arranged in the grooves 11a. The discharge tubes 20 are fixed to the supporting plate 11 by supporting members 14. The supporting plate 11 can be made of a resin or a metal (for instance, aluminum). A surface of the supporting plate 11 preferably is treated so as to have an increased light reflection efficiency or an increased light diffusion efficiency. For instance, titanium oxide powder may be applied to the surface or a reflection sheet may be laminated over the surface. Furthermore, a metal film may be formed on the surface of the supporting plate 11 as long as insulation from the outer electrode 22 is ensured. Alternatively, the surface may be treated by sand blasting. It should be noted that in the case where light is allowed to leave from a reverse side of the supporting plate 11, the supporting plate 11 is made of a transparent resin or glass. The shape of the supporting plate 11 is not limited, and is determined according to the intended use.

The diffusing plate 12 is arranged so as to face the supporting plate 11 with the discharge tubes 20 interposed therebetween. The diffusing plate 12 is arranged so as to uniformly diffuse light emitted from the discharge tubes 20. The diffusing plate 12 may be made of glass or a transparent resin.

A plurality of discharge tubes 20 are arranged in parallel with each other on the supporting plate 11. The number of the discharge tubes 20 is not limited, and one discharge tube 20 may be provided. The inner electrode 21 is arranged inside an end of each discharge tube 20. The discharge tubes 20 can be detached easily from the supporting members 14.

The first outer electrode 23 includes a plurality of linear electrodes 23a formed on the supporting plate 11. The plurality of linear electrodes 23a are connected with each other and are connected to the driving circuit 13. As shown in FIG. 1, the outer electrode 22 preferably is grounded. The grounding of the outer electrode 22 makes it possible to replace the discharge tubes 20 safely. The plurality of linear electrodes 23a are arranged in stripes. The linear electrodes 23a are formed so as to perpendicularly cross the central axes of the discharge tubes 20. The linear electrodes 23a may be formed, for instance, using a metal paste containing a metal powder and a resin (for example, silver paste), using metal films, or using a conductive resin (this applies to electrodes described below). In the case where the linear electrodes 23a are formed using a conductive resin, the supporting plate 11 made of a resin and the linear electrodes 23a made of a resin can be formed integrally.

With uniform intervals of the linear electrodes 23a, sometimes the brightness decreases with decreasing proximity to the inner electrodes 21. Therefore, as shown in FIG. 1, the distance between adjacent linear electrodes 23a may be decreased with decreasing proximity to the inner electrodes 21. In this case, the linear electrode 23a may have an increased width with decreasing proximity to the inner electrodes 21. This configuration facilitates obtaining uniform light emission.

Figure 5:
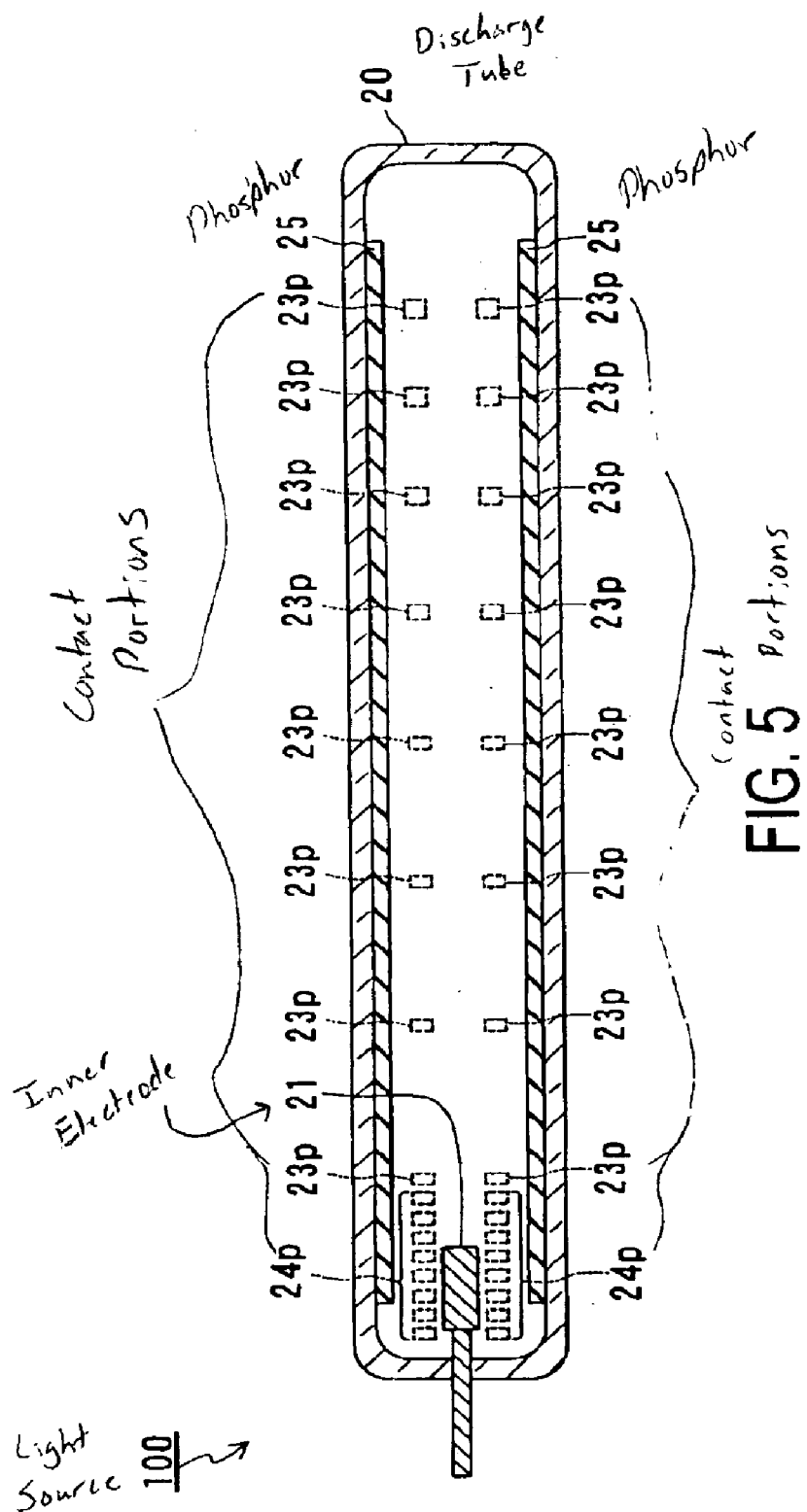
FIG. 5 is a view schematically illustrating a state in which a discharge tube and an outer electrode are in contact with each other.

As shown in FIG. 2, the linear electrodes 23a are in contact with the discharge tubes 20 at the grooves 11a. In other words, the first outer electrode 23 is brought into contact with an outer surface of each discharge tube 20 at a plurality of contact portions that are located at different distances from the inner electrode 21. An arrangement of the contact portions is shown in FIG. 5. The contact portions (first contact portions) 23p at which the linear electrodes 23a and the discharge tube 20 are brought into contact with each other form two groups that are arranged in parallel with the tube axis direction of the discharge tube 20. The contact portions 23p are separate from each other, and are provided discontinuously.

The first outer electrode 23 and the second outer electrode 24 are connected with each other via electric lines, thereby having substantially equal potentials. The second outer electrode 24 includes a plurality of linear electrodes 24a arranged substantially in parallel with the linear electrodes 23a. The linear electrodes 24a are brought in contact with the outer surface of the discharge tube 20 at contact portions (second contact portions) 24p. The contact portions 24p are closer to the inner electrode 21, as compared with the contact portions 23p. One of the contact portions 24p preferably is formed in the portion closest to the inner electrode 21 of the outer surface of the discharge tube 20. The contact portions 24p are arranged within a range of distance of approximately 10 mm from the inner electrode 21 normally. Furthermore, a surface density of the contact portions 24p is higher than a surface density of the contact portions 23p. Such contact portions are achieved by modifying the shapes and/or the arrangement of the electrodes. For instance, the linear electrodes 23a, each having a width of 1 mm, may be arranged at intervals of 1.0 mm to 50 mm, and the linear electrodes 24a, each having a width of 0.3 mm to 0.7 mm, may be arranged at intervals of 0.1 mm to 1.0 mm. The intervals between the linear electrodes 23a preferably are not less than 1.0 mm and not more than 50 mm. Furthermore, the intervals of the linear electrodes 24a preferably are not less than 0.1 mm and are less than 1.0 mm.

The discharge tube 20 is made of a transparent material, for instance, borosilicate glass. Alternatively, the discharge tube 20 may be made of quartz glass, soda-lime glass, or lead glass. The discharge tube 20 may include a dielectric layer (for instance, a resin layer) arranged on an outer surface thereof. To form the dielectric layer, it is possible to use, for instance, a multilayer film made of a polyester-based resin, or a thin film made of titanium oxide or silicon oxide. In the case where the discharge tube 20 includes a dielectric layer, the outer electrode 22 is formed on the dielectric layer. Furthermore, the outer electrode 22 may be in contact with the outer surface of the discharge tube 20 via a dielectric.

The glass tube used for forming the discharge tube 20 normally has an outside diameter of approximately 1.2 mm to 15 mm. Normally, the distance between the outer surface and an inner surface of the glass tube, that is, a wall thickness of the glass tube, is approximately 0.2 mm to 1.0 mm. In the case where a dielectric layer is formed on a surface of the glass tube, the dielectric layer normally has a thickness of approximately 0.5 $\mu$m to 100 $\mu$m. It should be noted that the discharge tube 20 does not necessarily have a straight shape, but may have another shape. For instance, it may be formed in a shape of the letter L or the letter U, or in a rectangular shape.

The discharge tube 20 is sealed, and a discharge medium (not shown) is encapsulated in the discharge tube (this also applies to Embodiments described later). A rare gas can be used as the discharge medium used in the light source device 100. The rare gas used therein can be at least one selected from krypton gas, argon gas, helium gas, and xenon gas. The discharge medium may contain mercury, in addition to the rare gas. It should be noted, however, that in the case where the discharge medium does not contain mercury, it is possible to prevent the light emission efficiency from varying in response to a change in a mercury vapor pressure that is caused by a change of the ambient temperature. Besides, an ultraviolet light radiated from xenon gas has a wavelength in proximity to a wavelength of an ultraviolet light radiated from mercury. Therefore, the use of xenon gas as the rare gas has an advantage in that the same phosphor as that used in a fluorescent lamp employing mercury can be used. The gas pressure inside the discharge tube 20 is, for instance, in a range of 2.66 kPa to 40.0 kPa, preferably in a range of 10 kPa to 30 kPa. It should be noted that the above-described discharge media are applicable as the discharge media in Embodiments described later.

Figure 6:
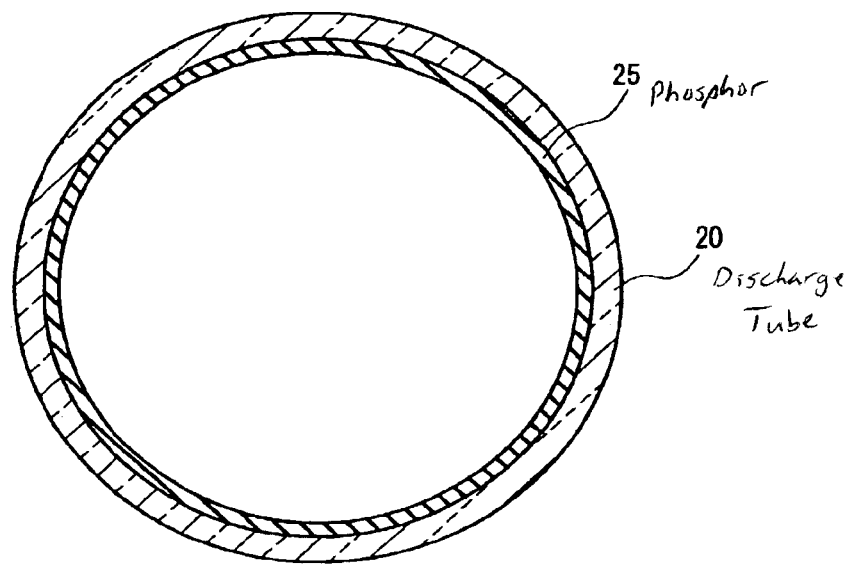
FIG. 6 is a cross-sectional view of an example of a discharge tube used in a light source device of the present invention.

A cross section of the discharge tube 20 is shown in FIG. 6. As shown in FIG. 6, a phosphor layer 25 is formed on an inner surface of the discharge tube 20. The phosphor layer 25 is formed so as to convert a wavelength of light emitted by the discharge medium. By altering materials of the phosphor layer 25, lights with various wavelengths can be obtained. For example, white light, red, green, and blue (RGB) lights, etc. can be obtained. The phosphor layer 25 can be made of a material generally used in a discharge lamp.

The inner electrode 21 is formed inside an end of the discharge tube 20. The inner electrode 21 can be made of a metal, for instance, tungsten or nickel. A surface of the inner electrode 21 may be covered with a metal oxide layer made of, for instance, cesium oxide, magnesium oxide, barium oxide, etc. The use of such a metal oxide layer allows an illumination start voltage to decrease, thereby preventing the electrode from being degraded by ion impact. Alternatively, the surface of the inner electrode 21 may be covered with a dielectric layer (for instance, a glass layer). The use of such a dielectric layer makes it possible to suppress current upon discharge. This suppresses the continuous flow of current upon discharge, thereby stabilizing the discharge.

In the light source device 100, the application of a voltage across the inner electrode 21 and the outer electrode 22 causes discharge, thereby exciting the discharge medium. The discharge medium thus excited emits ultraviolet light when making a transition to a ground state. The ultraviolet light is converted into visible light by the phosphor layer 25, and the visible light is radiated from the discharge tube 20. The visible light thus discharged is made to be more uniform light by the diffusing plate 12. Thus, the light source device 100 functions as a planar light source.

Figure 7:
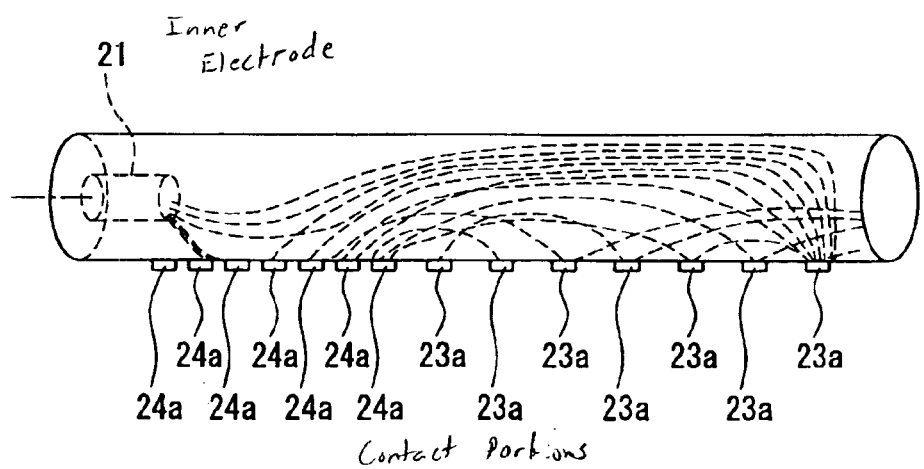
FIG. 7 is a view schematically illustrating a discharge state.

A discharge stage in the light source device 100 is illustrated schematically in FIG. 7. In FIG. 7, dotted lines extending from the inner electrode 21 indicate a discharge path. In the light source device 100, in the case where the gas pressure inside the discharge tube 20 was set to be not less than 1 kPa, constricted discharge was observed between each inner electrode 21 and the second outer electrode 24. However, in the other part, diffused discharge was obtained, which was improved with decreasing proximity to the inner electrode 21. This phenomenon can be considered as follows. In the vicinity of the inner electrode 21, constricted discharge occurs since the contact portions 24*p* therein are arranged at a high surface density. However, in the other part, excellently diffused discharge occurs since the contact portions 23*p* therein are arranged at a low surface density. In other words, in the light source device 100, by centralizing constricted discharge in the vicinity of the inner electrode 21, diffused discharge is caused in the other part. This configuration makes it possible to generate diffused discharge with a high light emission efficiency. Furthermore, this configuration allows excellent diffused discharge to be maintained even with a rise of the gas pressure inside the discharge tube and/or with an increase in the input voltage, thereby making it possible to obtain a high brightness.

So far, the light source device according to Embodiment 1 is described, but the light source device of the present invention is not limited to the configuration illustrated in the drawings (this applies to Embodiments described below). For instance, the first outer electrode does not have to include linear electrodes. Likewise, the second outer electrode does not have to include linear electrodes.

Figure 8:
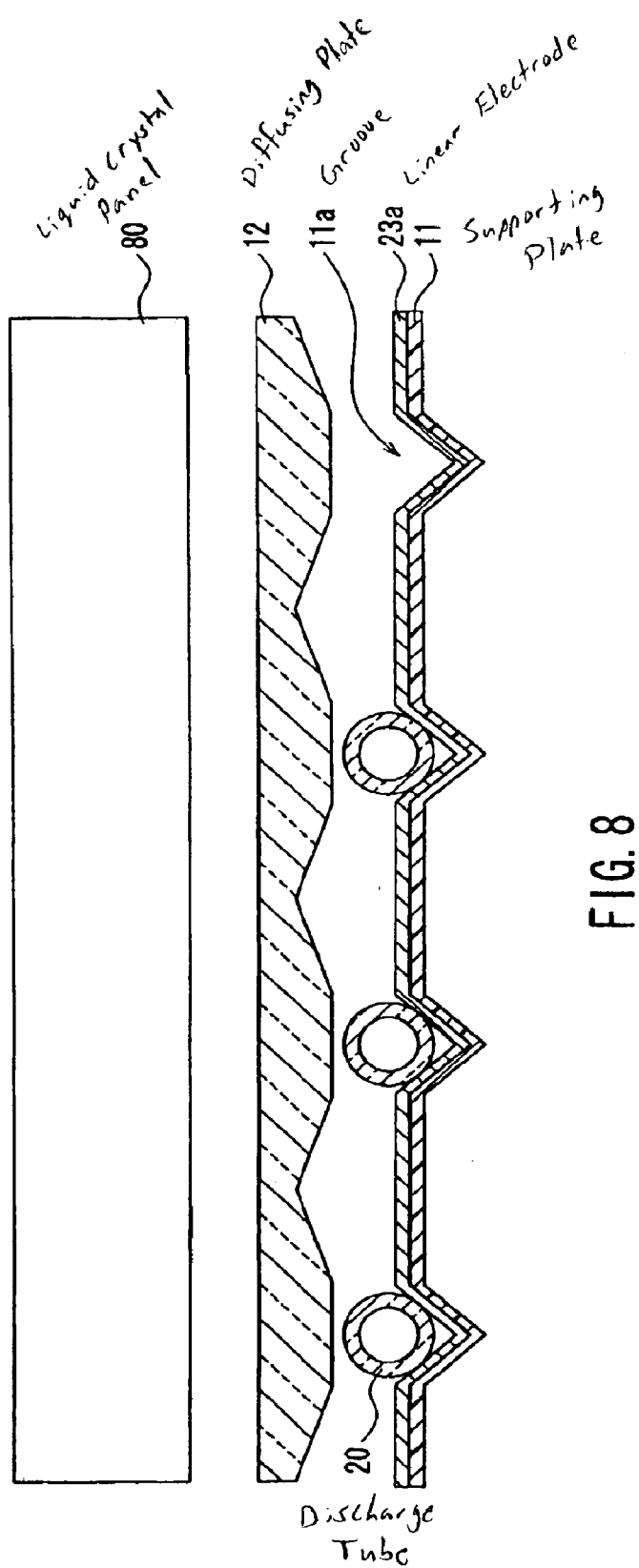
FIG. 8 is a cross-sectional view schematically illustrating an example of a liquid crystal display device of the present invention.

The light source device of Embodiment 1 may be used as a planar light source, and can be used, for instance, as a backlight of a liquid crystal display device (this applies to Embodiments described below). In this case, as shown in FIG. 8, a liquid crystal panel 80 is arranged above the diffusing plate 12.

Embodiment 2

Figure 9:
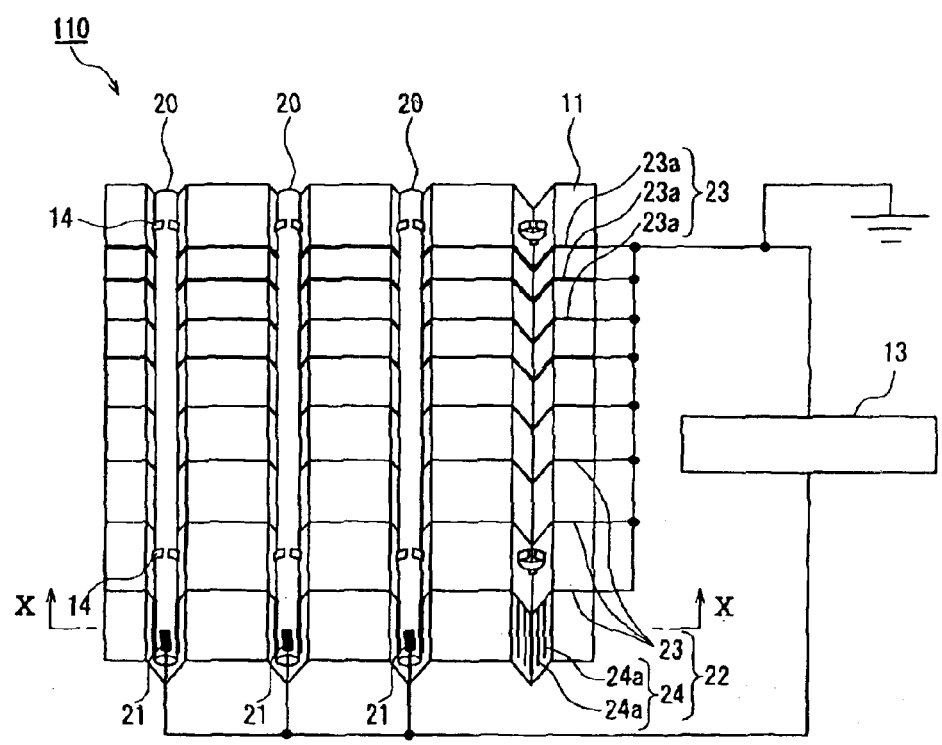
FIG. 9 is a perspective view schematically illustrating still another example of a light source device of the present invention.
Figure 10:
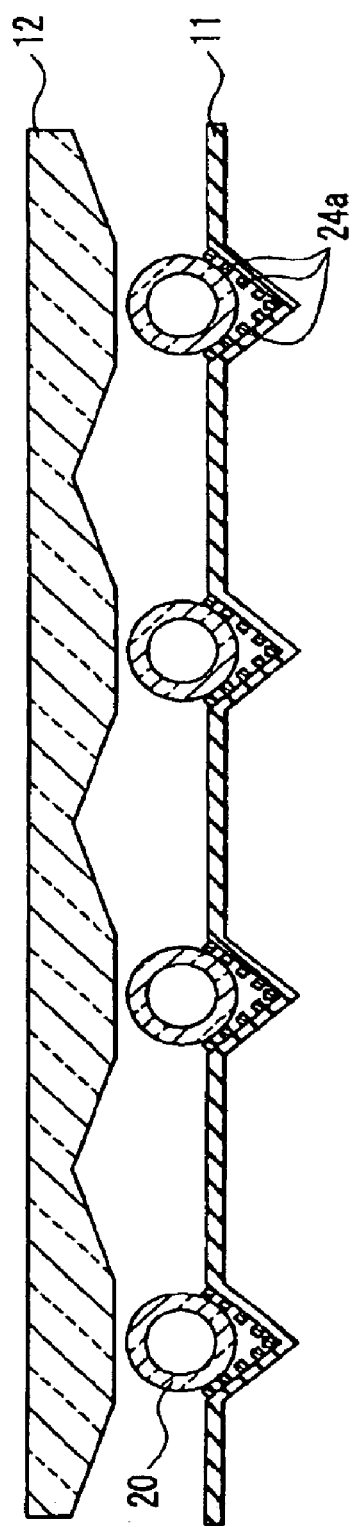
FIG. 10 is a cross-sectional view of the light source device shown in FIG. 9.

In Embodiment 2, another example of a light source device of the present invention is described. FIG. 9 is a perspective view schematically illustrating a light source device 110 of Embodiment 2. FIG. 10 is a cross-sectional view of the light source device 110 taken along a line X—X in FIG. 9.

The light source device 110 is identical to the light source device 100 except for the shape of the second outer electrode 24. Therefore, the descriptions of the members other than the second outer electrode 24 are omitted herein.

In the light source device 110 according to Embodiment 2 as well, the second electrode 24 is in contact with each discharge tube 20 at a higher surface density than that of the first outer electrode 23. Besides, the second outer electrode 24 is arranged at positions closer to the inner electrodes 21, as compared with the first outer electrode 23. The second outer electrode 24 includes a plurality of linear electrodes 24*a*. The linear electrodes 24*a* are arranged substantially in parallel with each other in a direction along the tube axis direction of each discharge tube 20. The linear electrodes 24*a* are arranged at narrower intervals as compared with the intervals of the linear electrodes 23*a*. An end of each linear electrode 24*a* is connected electrically with the linear electrode 23*a*, so that the first outer electrode 23 and the second outer electrode 24 have substantially equal potentials.

It should be noted that there is no particular limitation on the shape of the second outer electrode 24. The second outer electrode 24 may have any shape as long as the second outer electrode 24 is in contact with the discharge tube at a higher surface density than that of the first outer electrode 23. For instance, the second outer electrode 24 may have any one of shapes shown in FIGS. 11A to 11C.

Figure 11A:
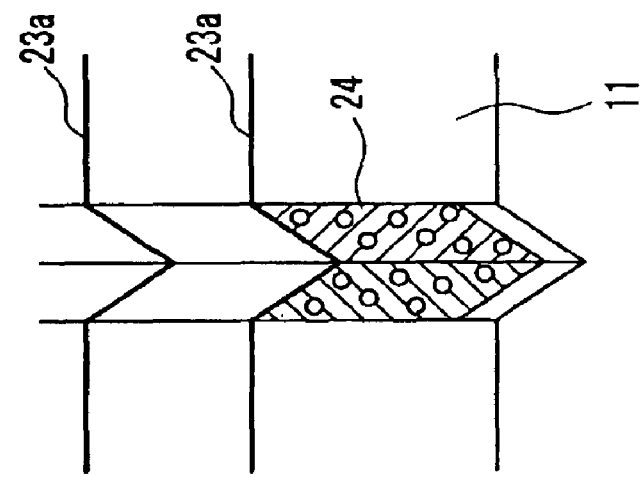
FIGS. 11A to 11C are views illustrating examples of a second outer electrode.
Figure 11B:
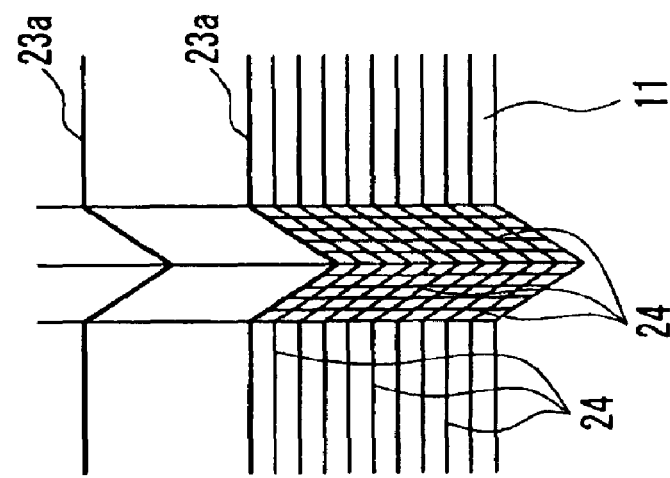
Figure 11C:
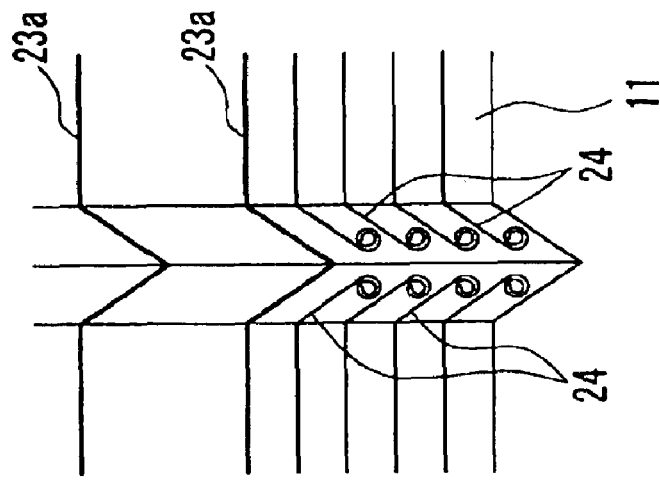

In FIG. 11A, the second outer electrode 24 is hatched, so as to help the understanding. The outer electrode 24 shown in FIG. 11A is a conductive film in which perforations are formed. In this case, the perforations thus formed allow for an increased light emission efficiency. The second outer electrode 24 in FIG. 11B has a lattice form. The second outer electrode 24 shown in FIG. 11C has a shape in which each end has a helix form.

Embodiment 3

In Embodiment 3, still another example of a light source device of the present invention is described. The light source device according to Embodiment 3 is identical to the light source device according to Embodiment 1 except for the second outer electrode, and hence, the descriptions of the members other than the second outer electrode are omitted herein.

Figure 12:
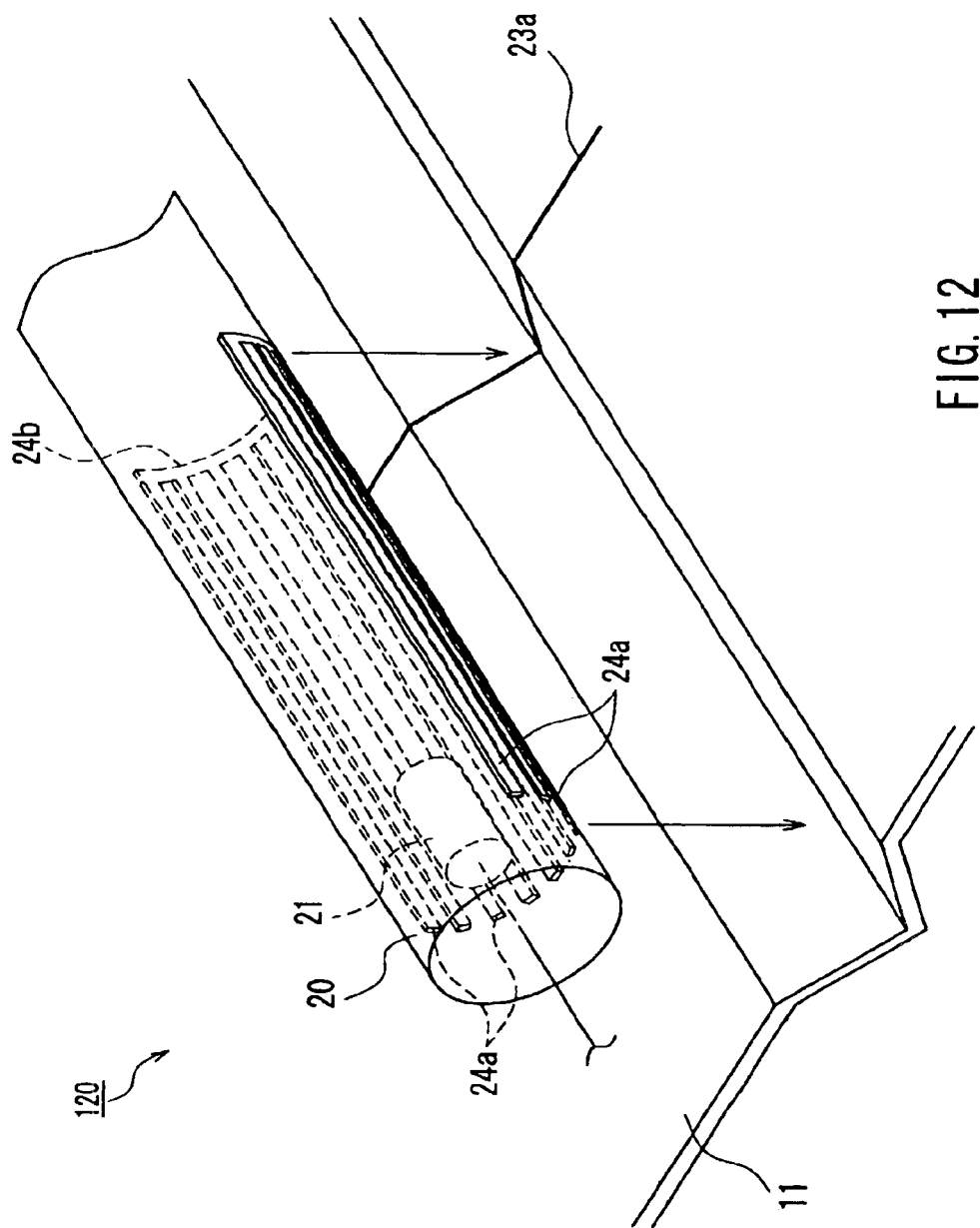
FIG. 12 is an exploded view schematically illustrating a part of still another example of a light source device of the present invention.
Figure 13:
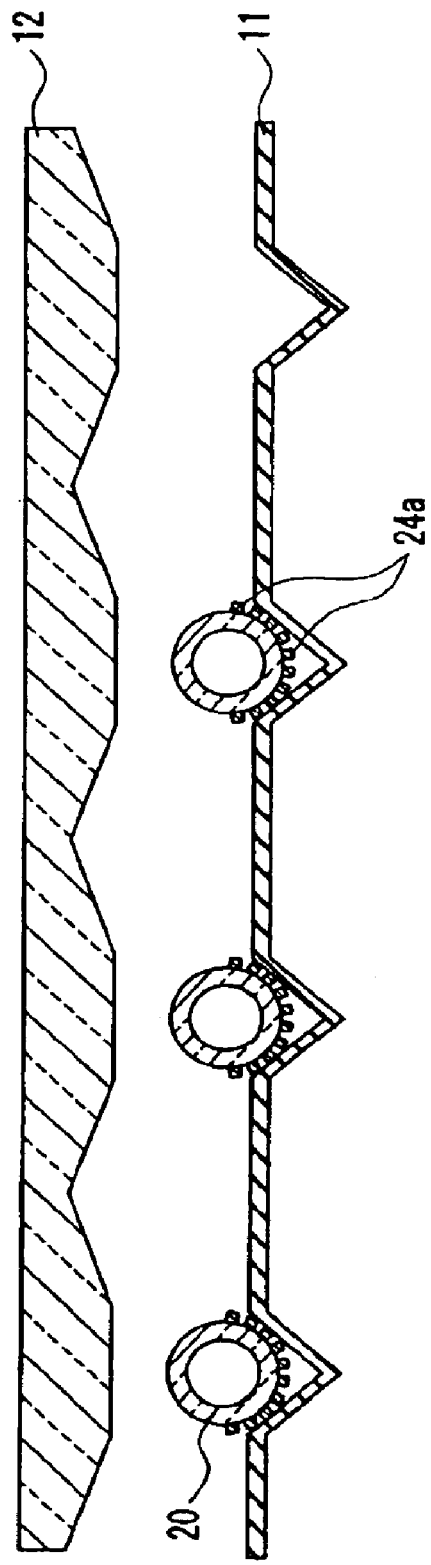
FIG. 13 is a cross-sectional view of the light source device shown in FIG. 12.

FIG. 12 is an exploded view schematically illustrating a part of a light source device 120 according to Embodiment 3. FIG. 13 is a cross-sectional view of the light source device 120 taken along a second outer electrode thereof. In the light source device 120, a second outer electrode 24 is formed in the vicinity of the inner electrode 21 on an outer surface of the discharge tuber 20. The second outer electrode 24 includes a plurality of linear electrodes 24*a*, as well as a linear electrode 24*b* connecting the plurality of linear electrodes 24*a*. The linear electrodes 24*a* are arranged substantially in parallel with the tube axes of the discharge tubes 20. The linear electrode 24*b* is formed so as to be brought into contact with the linear electrodes 23*a* when the discharge tube 20 is fitted on the supporting plate 11. This configuration allows the first outer electrode 23 and the second outer electrode 24 to have substantially equal potential. The linear electrodes 24*a* are in contact with each discharge tube 20 at a higher surface density than that of the linear electrode 23*a*. It should be noted that the linear electrodes 24*a* may be formed through an entire circumference of the discharge tube 20.

Embodiment 4

In Embodiment 4, still another example of a light source device of the present invention is described. The light source device according to Embodiment 4 is identical to the light source device according to Embodiment 1 except for the second outer electrode, and hence, the descriptions of the members other than the second outer electrode are omitted herein.

Figure 14:
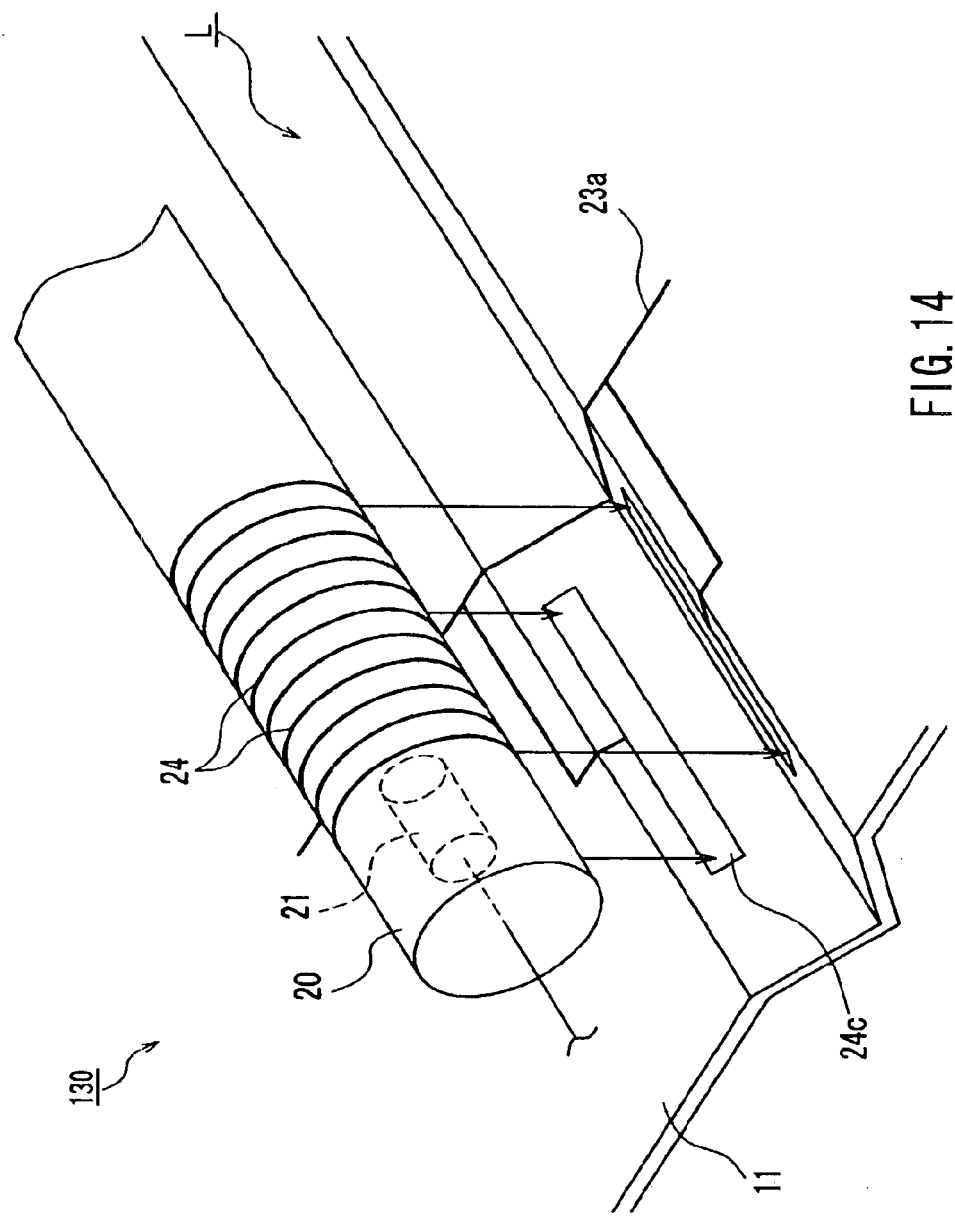
FIG. 14 is an exploded view schematically illustrating a part of still another example of a light source device of the present invention.
Figure 15:
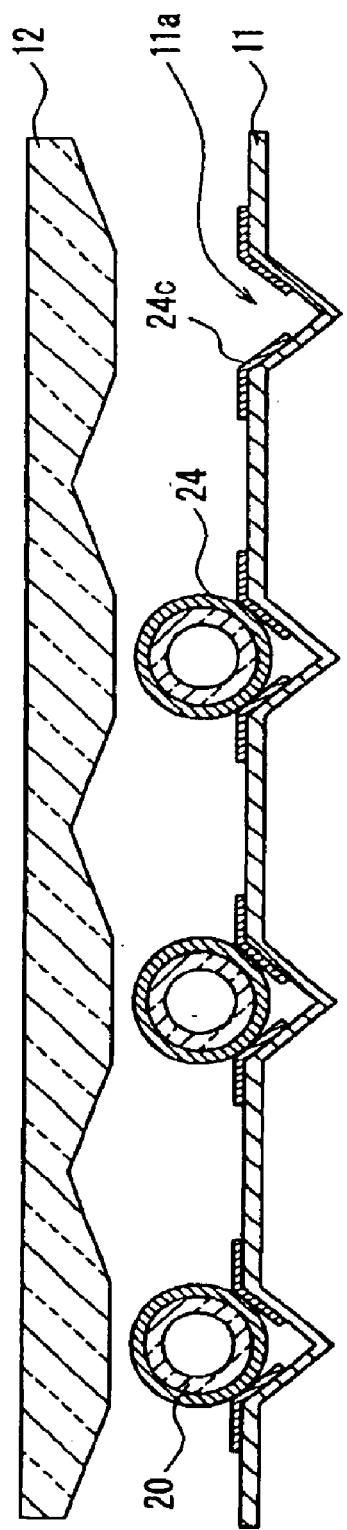
FIG. 15 is a cross-sectional view of the light source device shown in FIG. 12.

FIG. 14 is an exploded view schematically illustrating a part of a light source device 130 according to Embodiment 4. FIG. 15 is a cross-sectional view of the light source device 130 taken along a second outer electrode thereof. In the light source device 130, a second outer electrode 24 is formed in the vicinity of the inner electrode 21. The second outer electrode 24 is formed in a form of rings on the outer surface of the discharge tube 20. The second electrode 24 is in contact with each discharge tube 20 at a higher surface density than that of the linear electrode 23*a*. On the supporting plate 11, electrode terminals 24*c* are formed so as to connect the second outer electrode 24 with the linear electrodes 23a. The second outer electrode 24 is connected electrically with the linear electrodes 23a via the electrode terminals 24c when the discharge tubes 20 are fitted on the supporting plate 11.

Figure 16B:
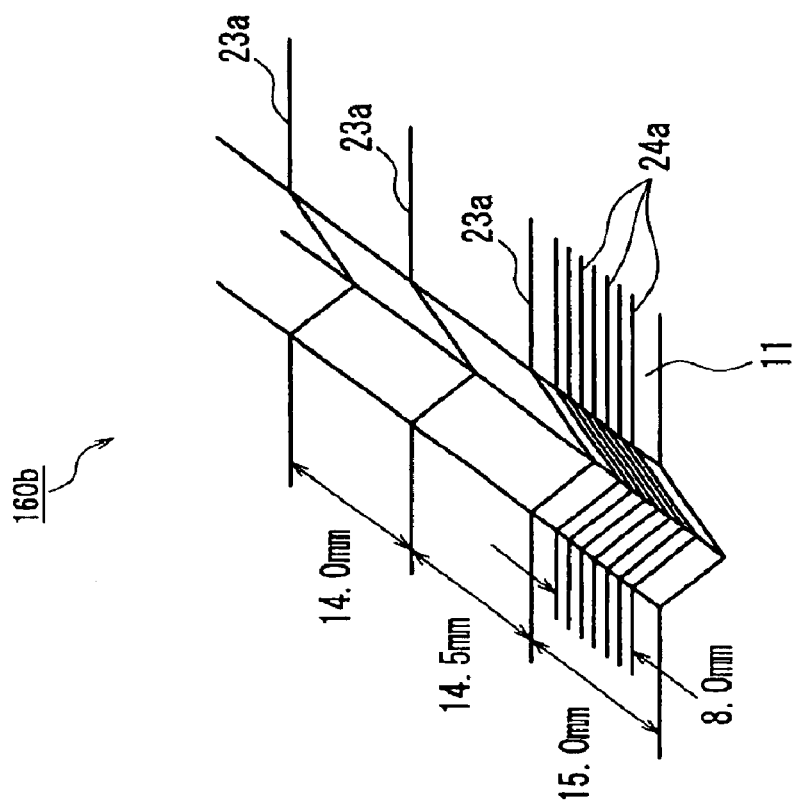
FIGS. 16A and 16B are perspective views illustrating arrangements of electrodes in light source devices used for the evaluation of properties.
Figure 16A:
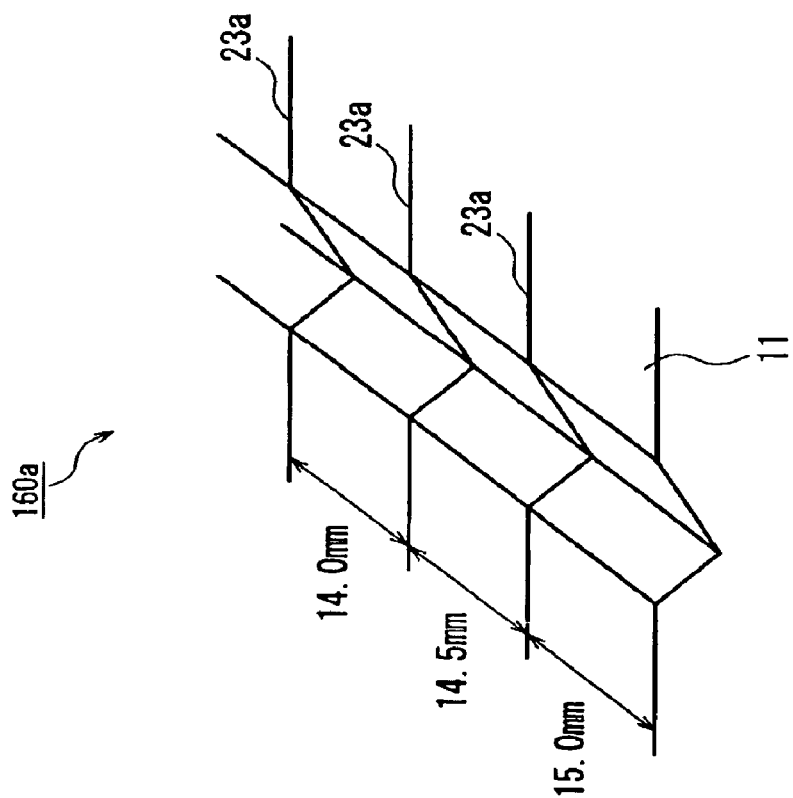

To check the effect of the second outer electrode, properties of the light source device 100 according to Embodiment 1 and those of a light source device without the second outer electrode were compared. The respective arrangements of electrodes of the foregoing two light source devices used in the comparison are shown in FIGS. 16A and 16B. In a light source device 160a as shown in FIG. 16A, a plurality of linear electrodes 23a (1 mm in width) were arranged in parallel. The linear electrodes 23a were arranged so that a space between adjacent two linear electrodes 23a was decremented by 0.5 mm with decreasing proximity to the internal electrode 21, for instance, in a manner of 15.0 mm, 14.5 mm, 14.0 mm. The second outer electrode was not formed in the light source device 160a.

In a light source device 160b, as shown in FIG. 16B, the linear electrodes 23a were arranged in the same manner as the linear electrodes 23a in the light source device 160a. In the light source device 160b, a second outer electrode 24 having an equal potential to that of the linear electrodes 23a was formed. More specifically, in a portion closer to the inner electrode 21 as compared with the linear electrodes 23a, a plurality of linear electrodes 24a were arranged in parallel with each other within a distance of 8 mm. A plurality of such light source devices were prepared that differed from one another in spacing and width of the linear electrodes 24a. The width of the linear electrodes 24a was varied within a range of 0.3 mm to 1.0 mm.

Figure 17:
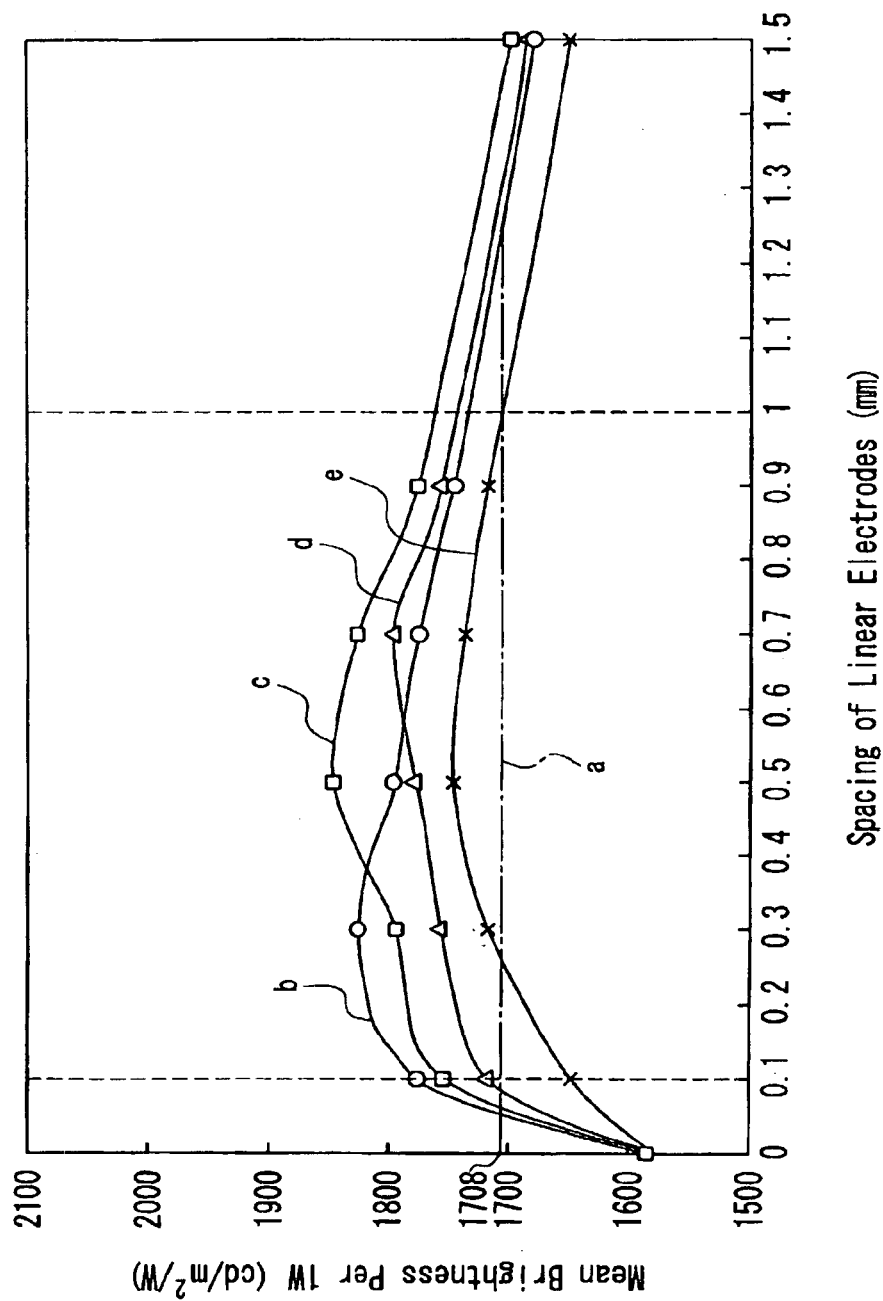
FIG. 17 is a graph showing the relationship between the intervals of electrodes and the mean value of brightness, as to light source devices that differ in electrode width from one another.

The light source devices 160a and 160b were made to have completely the same configuration except for the presence/absence of the second outer electrode. Xenon was used as the gas sealed therein, and the internal pressure of the discharge tube 20 was set to be 13.3 kPa. A green-light-emitting phosphor was applied on an inner surface of the discharge tube 20 (length: 220 mm, outside diameter: 4 mm). A pulse voltage with a pulse height of 2 kV, a pulse amplitude of 10 $\mu$sec, and a frequency of 30 kHz was applied across the inner and outer electrodes. Then, a mean value of brightness per 1 W (cd/m$^2$/W) was measured as to each light source device. The measurement result is shown in FIG. 17. It should be noted that the mean value of brightness was determined by measuring a brightness of the surface of the discharge tube 20 except for a 10-mm-long end portion on the inner electrode 21 side.

The horizontal axis of FIG. 17 indicates the spacing of the linear electrodes 24a, while the vertical axis indicates the mean value of brightness per 1 W. The result of the optical device 160a is indicated by a line a in FIG. 17 for reference purposes, but the line "a" is irrelevant to the horizontal axis. A line "b" indicates the result in the case where the linear electrodes 24a had a width of 0.3 mm. Likewise, lines "c", "d", and "e" indicate the result in the case where the linear electrodes 24a had a width of 0.5 mm, the result in the case where the linear electrodes 24a had a width of 0.7 mm, and the result in the case where the linear electrodes 24a had a width of 1.0 mm, respectively.

As shown in FIG. 17, the light source device 160a had a maximum brightness of 1708 (cd/m$^2$/W). In the case of the light source devices 160b having the second outer electrodes 24 with electrode widths in a range of 0.3 mm to 0.7 mm and intervals of not less than 0.1 mm to less than 1.0 mm, brightness levels higher than that of the light source device 160a were obtained, as indicated by the lines "b" to "d". In the case where the electrode width was 0.3 mm, the interval preferably was set to be 0.3 mm in particular. In the case where the electrode width was 0.5 mm, the interval preferably was set to be 0.5 mm. In the case where the electrode width was 0.7 mm, the interval preferably was set to be 0.7 mm. On the other hand, as indicated by the line "e", in the case where the electrode width was 1.0 mm, the interval preferably was set to be 0.3 mm to 0.9 mm (0.5 mm in particular). Thus, the use of the light source device having the second outer electrode makes it possible to obtain higher brightness.

So far, light source devices of the present invention have been described, but the present invention is not limited to the above-described embodiments. For instance, though the light source devices each having a supporting plate have been described in the foregoing description, the light source device of the present invention may be a discharge lamp device without a supporting plate. In this case, the first and second outer electrodes may be formed on an outer surface of a discharge tube. Furthermore, in a light source device of the present invention, a discharge tube may be arranged on a side face of a light-guiding plate. In this case, light emitted from the discharge tube enters the light-guiding plate via the side face of the light-guiding plate, and is allowed to leave the light-guiding plate via a principal surface of the light-guiding plate.

As described above, a light source device of the present invention includes a first outer electrode brought into contact with a discharge tube at contact portions provided discontinuously, and a second outer electrode arranged at a higher surface density at a position closer to an inner electrode as compared with the first outer electrode. The use of such electrodes makes it possible to obtain excellent diffused discharge in the discharge tube except for the vicinity of the second outer electrode. This state is likely to be maintained even with a rise of the gas pressure inside the discharge tube or an increase in the input voltage. Therefore, in the light source device of the present invention, it is possible to suppress a decrease in the light emission efficiency, and to suppress a rise of temperature of the discharge tube.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A light source device comprising:
   at least one discharge tube;
   a discharge medium sealed inside the discharge tube; and
   inner and outer electrodes for exciting the discharge medium, wherein
   the inner electrode is arranged inside only one end of the discharge tube,
   the outer electrode includes a first outer electrode and a second outer electrode, the second outer electrode being connected electrically with the first outer electrode,
   the first outer electrode is in contact with an outer surface of the discharge tube at a plurality of first contact portions, the first contact portions being located at different distances from the inner electrode and being provided discontinuously, the second outer electrode is in contact with the outer surface of the discharge tube at second contact portions, the second contact portions are arranged closer to the inner electrode than the first contact portions at a surface density greater than that of the first contact portions, and the plurality of the first contact portions are arranged in a tube axial direction of the discharge tube.

2. The light source device according to claim 1, wherein the discharge tube includes a glass tube, and a dielectric layer formed on an outer surface of the glass tube.

3. The light source device according to claim 1, wherein the first and second outer electrodes are in contact with the discharge tube via a dielectric.

4. The light source device according to claim 1, wherein the discharge medium contains at least one selected from xenon gas, krypton gas, argon gas, neon gas, and helium gas.

5. The light source device according to claim 4, wherein the discharge medium does not contain mercury.

6. The light source device according to claim 1, further comprising a supporting plate, wherein a plurality of the discharge tubes are held on the supporting plate, the first outer electrode includes a plurality of first linear electrodes arranged in parallel, and the discharge tubes are arranged so as to be perpendicular to the linear electrodes.

7. The light source device according to claim 6, wherein the second outer electrode includes a plurality of second linear electrodes arranged substantially in parallel with the first linear electrodes, intervals at which the first linear electrodes are arranged are not less than 1.0 mm and not more than 50 mm, and intervals at which the second linear electrodes are arranged are not less than 0.1 mm and less than 1.0 mm.

8. A liquid crystal display device comprising a light source device, and a liquid crystal panel that transmits light emitted from the light source device, wherein the light source device includes at least one discharge tube, a discharge medium sealed inside the discharge tube, and inner and outer electrodes for exciting the discharge medium, wherein the inner electrode is arranged inside only one end of the discharge tube, the outer electrode includes a first outer electrode and a second outer electrode that are connected electrically with each other, the first outer electrode is in contact with an outer surface of the discharge tube at a plurality of first contact portions, the first contact portions being located at different distances from the inner electrode and being provided discontinuously, the second outer electrode is in contact with the outer surface of the discharge tube at second contact portions, the second contact portions are arranged closer to the inner electrode than the first contact portions at a surface density greater than that of the first contact portions, and the plurality of the first contact portions are arranged in a tube axial direction of the discharge tube.

9. The liquid crystal display device according to claim 8, wherein the light source device further includes a light-guiding plate that receives light emitted from the discharge tube and allows the light to leave a principal surface thereof, and the liquid crystal panel is arranged so as to face the light-guiding plate.

10. The liquid crystal display device according to claim 8, wherein the light source device further includes a supporting plate, wherein a plurality of the discharge tubes are held on the supporting plate, the second outer electrode includes a plurality of linear electrodes arranged in parallel, and the discharge tubes are arranged so as to be perpendicular to the linear electrodes.

* * * * *